US011003334B1

(12) United States Patent
Conway et al.

(10) Patent No.: US 11,003,334 B1
(45) Date of Patent: May 11, 2021

(54) HOME SERVICES CONDITION MONITORING

(71) Applicant: Allstate Insurance Company, Northbrook, IL (US)

(72) Inventors: Ann Conway, Chicago, IL (US); Mark E. Faga, Evanston, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 660 days.

(21) Appl. No.: 15/716,900

(22) Filed: Sep. 27, 2017

Related U.S. Application Data

(63) Continuation-in-part of application No. 15/670,623, filed on Aug. 7, 2017, now abandoned, which is a continuation-in-part of application No. 15/278,259, filed on Sep. 28, 2016, now abandoned, which is a continuation-in-part of application No. 15/086,834, filed on Mar. 31, 2016, now Pat. No. 10,831,350.

(51) Int. Cl.
*G06Q 40/08* (2012.01)
*G06Q 10/00* (2012.01)
*G06F 3/0484* (2013.01)
*H04L 12/28* (2006.01)
*H04L 29/08* (2006.01)

(52) U.S. Cl.
CPC ......... *G06F 3/04842* (2013.01); *G06Q 10/20* (2013.01); *G06Q 40/08* (2013.01); *H04L 12/2803* (2013.01); *H04L 67/12* (2013.01)

(58) Field of Classification Search
CPC ...... G06Q 40/08; G06Q 10/00; G06F 3/0484; H04L 12/28; H04L 29/08
See application file for complete search history.

(56) References Cited

U.S. PATENT DOCUMENTS

| | | | |
|---|---|---|---|
| 6,611,807 B1 | 8/2003 | Bernheim et al. | |
| 8,400,299 B1 * | 3/2013 | Maroney | G06Q 10/10 340/540 |
| 10,102,585 B1 * | 10/2018 | Bryant | G06Q 50/16 |
| 10,198,771 B1 * | 2/2019 | Madigan | G06Q 40/08 |
| 2007/0067180 A1 | 3/2007 | James et al. | |
| 2008/0255862 A1 | 10/2008 | Bailey et al. | |
| 2011/0270773 A1 | 11/2011 | Siekman et al. | |
| 2014/0233141 A1 * | 8/2014 | Blemel | H02H 1/0023 361/78 |
| 2014/0257862 A1 * | 9/2014 | Billman | G06Q 40/08 705/4 |
| 2014/0330594 A1 | 11/2014 | Roberts et al. | |
| 2014/0358592 A1 * | 12/2014 | Wedig | G06Q 40/08 705/4 |
| 2015/0100508 A1 | 4/2015 | Binion et al. | |

(Continued)

OTHER PUBLICATIONS

Accuracy Assured Home Inspections, LLC, Thome Energy Tune-Up, http://www.accuracyinspections.com/energyaudit.htm, pp. 1-6, obtained off internet Mar. 31, 2016.

(Continued)

*Primary Examiner* — Scott S Trotter
(74) *Attorney, Agent, or Firm* — Banner & Witcoff, Ltd.

(57) ABSTRACT

Methods, computer-readable media, systems and apparatuses for receiving data from one or more sensors associated with one or more home devices for a plurality of homes relating to one or more possible perils such as water perils.

15 Claims, 15 Drawing Sheets

(56) References Cited

U.S. PATENT DOCUMENTS

| | | |
|---|---|---|
| 2015/0193864 A1 | 7/2015 | Allison et al. |
| 2016/0161940 A1* | 6/2016 | Max .......................... F17D 5/06 700/282 |
| 2016/0180347 A1 | 6/2016 | Greene et al. |
| 2017/0006135 A1 | 1/2017 | Siebel et al. |

OTHER PUBLICATIONS

Angles List Home Tune-Up, What does your Home Tune-Up include, pp. 1-2, https://www.angieslist.com/tuneup, obtained off Internet Mar. 31, 2016.

Allstate Insurance Company, Guest Insurance Services, https://www.facebook.com/GuestInsurance Services/posts/790538040994552, p. 1, obtained off internet Mar. 31, 2016.

Oct. 18, 2017—(WO) International Search Report—PCT/US17/52640.

\* cited by examiner

Dear Sam,
Welcome to Home Services Account - the one place you can go to buy all the products and services you need to take care of your home AND earn money back on what you spend. With your membership you will have free access to Expert Advice. Once you purchase a Premium Home insurance policy, you will receive a $50 bonus to spend in your home services account.
Sincerely
Joe Insurance Agent

OFFERS

Moving Supplies $49

Handyman Services $99

Upgrade your kitchen appliances - see deals

FIG. 7A

Dear Sam,
You *received* a $50 *bonus* for joining the home services account. There's a lot to do when you move into a new home. Here are recommendations as to what to do first.

Recommendations:
- Check Smoke Detectors/Alarms
- Find a Local Handyman
- Upgrade appliances to energy efficient appliances

OFFERS

4 Hours painting from Painting Services $200 ($10 credit)

2 hours Handyman Services $100 ($5 credit)

Upgrade your kitchen appliances - see deals

Dear Sam,

Your roof showed signs of damage. Given that your area is prone to strong storms in the spring, we recommend you replace your roof to avoid damage and increase safety and value of your home.

722

OPTIONS

Roof Patch
$500-$2000

Roof Replacement
$4000-$10,000

OFFER
For our Home Services
Account Customers
Roof Replacement
$6000 ($600 credit)

Dear Sam,
It is nearing winter. Did you know that water trapped in your gutter can freeze, forming ice dams, and weigh down the gutter, causing damage. All of these can be avoided if the gutters are cleaned regularly.

Recommendations:
- Clean gutters
- Furnace tune up
- Weather stripping

732

OFFERS

Air Filters $20 with 2X credits

Weather stripping kit $100

Gutter cleaning service $79
with 2X credits

| Home Improvement | Estimated Cost | Estimated Increase in Selling Price |
|---|---|---|
| Bedroom Addition | $20,000 | $10,000 |
| Kitchen Remodel | $16,000 | $16,000 |
| Replace Roof | $6,000 | $0* |
| Improve Garden Beds | $500 | $0* |

\* Increases salability of home

FIG. 10

HOME SERVICES CONDITION MONITORING

CROSS-REFERENCE TO RELATED APPLICATIONS

This application claims priority to U.S. patent application Ser. No. 15/670,623, filed Aug. 7, 2017, now abandoned, which claims priority to U.S. patent application Ser. No. 15/278,259, filed Sep. 28, 2016, now abandoned, which claims priority to U.S. patent application Ser. No. 15/086,834, filed Mar. 31, 2016, which are hereby incorporated by reference in their entireties.

TECHNICAL FIELD

Various aspects of the disclosure relate to a technological system for home servicing including sensors, computing devices, receiving and analyzing relevant data, models for identifying risks for specific perils, models for scoring homes based on risks, actions taken to prevent or mitigate risks, insurance systems, and real-time communication devices.

BACKGROUND

Performing services on a home or other structure is an important aspect in maintaining or increasing value in the property. However, homeowners are often unsure of the different types of services (e.g. maintenance or improvements) that should be performed or the value that is added to the home by the different types of services. For example, homeowners are often unaware or negligent in servicing appliances which can lead to inefficiencies, break-downs, and even fire or water damage. Providing homeowners with real-time, convenient access to experts knowledgeable in their specific areas of concern would assist them in better servicing their homes.

Some services may increase the sale price or value of a home such as upgraded kitchens or addition of a deck. Some services do not increase the value of a home but are still necessary to maintain the value of the home such as replacement of a roof or appliances. Some services provide safety features such as home security systems or smoke detectors. Further, a homeowner may not be aware of timing for services. For example, roofs are recommended to be replaced about every 20 years; however, some roofs last longer and some shorter. Appliances generally have a certain lifespan and often have recommended services to ensure the lifespan.

In addition, some homeowners become laissez faire in dealing with their home and do not take an active role in fixing or improving their home, often waiting until the home is sold to perform necessary services or upgrades. By this point, such services may be more expensive and/or upgrades are being done for the benefit of the new owner whereas an existing owner could have enjoyed the upgrade.

Further, there has been no real mechanism of knowing if a homeowner has performed necessary repairs or recommended upgrades. For example, an insurance company may not know if a homeowner actually used an insurance payout to actually repair the problem in their home.

In addition there is no real mechanism to gather useful and relevant data (static, dynamic and behavioral) to generate risk models in order to identify specific risks and then to recommend actions to prevent or mitigate those risks. Further there is no mechanism to score homes based on risks for perils and update the insurance premium based on identified risks and risk scores for the perils.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems to receive data from one or more sensors associated for a plurality of homes relating to one or more possible perils such as water perils, data from home inspection reports and home checkups, and environmental data.

Further aspects of the disclosure relate to systems for analyzing the data along with claims and policy data to generate risk assessments for specific perils in order to be able to identify presence or likelihood of occurrence of specific perils in homes.

Based on collected data and calculated risk assessments, actions may be taken or services provided by the user, insurance companies, and third party providers. The home services system may provide identification of an event (e.g. a water leak) as it is occurring and likely to occur and then trigger an alert/recommendation for the homeowner or a direct intervention.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 7A is one example user interface for displaying an example message and offers to a homeowner, according to one or more aspects of the disclosure.

FIG. 7B is another example user interface for displaying an example message and offers to a customer, according to one or more aspects of the disclosure.

FIG. 7C is another example user interface for displaying an example message and offers to a non-customer, according to one or more aspects of the disclosure.

FIG. 7D is another example user interface for displaying an example message and offers to a customer, according to one or more aspects of the disclosure.

FIG. 10 is an example of an interface for home values.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the disclosure relate to a home services systems including identifying a list of home products and/or services recommended for a home, determining whether home products and/or services have been purchased or completed, and providing a home services account in which to purchase products and services and/or offer tokens and/or discounts for past or future home products or services, and/or offer expert advice. Further aspects relate to assessing features of a home and providing information regarding the effect home improvements may have on the sale price or value of the home.

The term home may be for any home dwelling including stand-alone houses, duplexes, town houses, apartments, mobile homes, or modular homes. In a particular aspect, the home is a single-family home.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
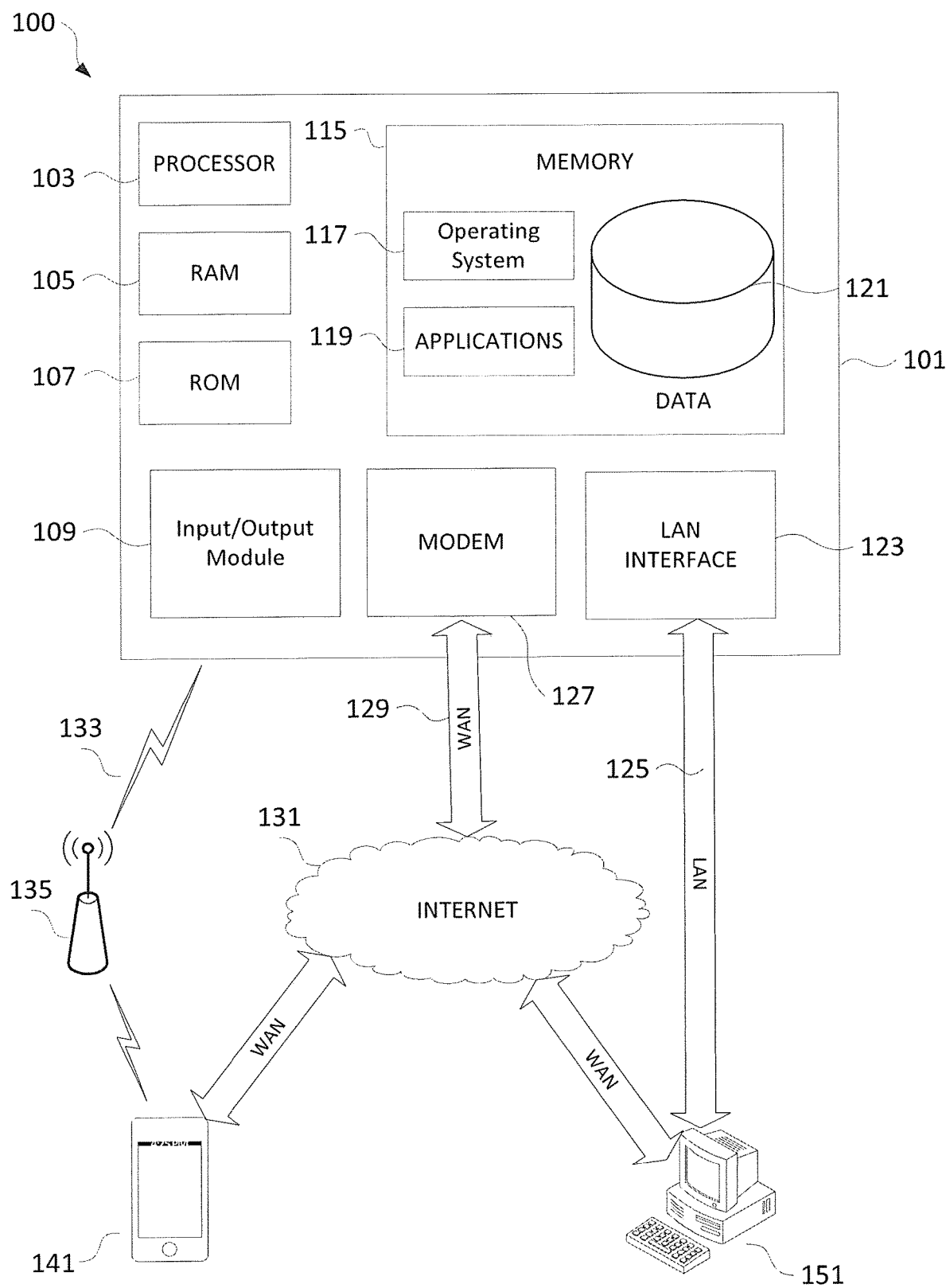
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, insurance systems servers, home monitoring computing devices, external data sources and other various devices in a home services system. These various computing systems may be configured individually or in combination, as described herein, for generating lists of recommended services, providing recommendations of top reliable service providers for services, home service accounts for completing services, tracking completion of services, and providing incentives for to initiate and complete services. Further features of the home service account may include offering clickable links to experts for advice tailored to the type of recommended services. Further features of the home service account may include tokens (money, credit, or other incentives) and/or discounts for recommended service providers. Further features include for generating home service accounts for home products, tracking purchase of home products, and providing incentives for purchasing home products. Further features of the home service account may include providing the user with information regarding the effect of completed home services may have on the value or sale price of the home as an incentive for initiating such services.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within home service services systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, insurance system server 101, home monitoring system/server, etc.), in order to provide home services systems to determine potential services (including products), determine whether the services have been purchased/completed, determine potential value added due to the services, and tokens and/or discounts related to encouraging and/or completing home services. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to determine potential services, determine whether the services have been accomplished, determine potential value added due to the services, recommend products and services related to the services, and to offer incentives and/or discounts related to encouraging or completing home services.

The computing device (e.g., a personal mobile device, insurance system server, home monitoring system/server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), home system monitoring devices, and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, an insurance server, an intermediary server and/or external data source servers, home system monitoring device, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a home or associated with a home and home information datacenter or in a cloud infrastructure supporting a cloud-based home system data retrieval and analysis. In other examples, the security and integration layer 160 may correspond to separate hardware and software components which may be operated at a separate physical location and/or by a separate entity.

As discussed below, the data transferred to and from various devices in a home services system 100 may include secure and sensitive data, such as confidential home system operation data, insurance policy data, and confidential user data from users associated with a home. Therefore, it may be desirable to protect transmissions of such data by using secure network protocols and encryption, and also to protect the integrity of the data when stored on the various devices within the system, such as personal mobile devices, insurance servers, external data source servers, home system monitoring devices, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display in the system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., home system data, user data, vehicle data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a home system data and/or user data analysis web service, a home service services determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls.

Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of home system data, user data, user behaviors or characteristics, account balance data, etc.) is cached in a separate smaller database on an application server separate from the database server (e.g., at a personal mobile device, home system monitoring device, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of home service services systems, such as faster response times and less dependence on network conditions when transmitting and receiving home system information, user information, account information, reward information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in home service services system components described herein may be configured to communicate using any of these network protocols or technologies.

Additionally, one or more application programs 119 may be used by the various computing devices 101 within a home services system 100 (e.g., home system data and/or user data analysis software applications, insurance parameter determination software applications, token generating applications, etc.), including computer executable instructions for determining recommended services, determining whether the services have been accomplished, determining potential value added due to the services, recommending products and services related to the services, and offering tokens and/or discounts related to encouraging and/or completing home services.

Figure 2:
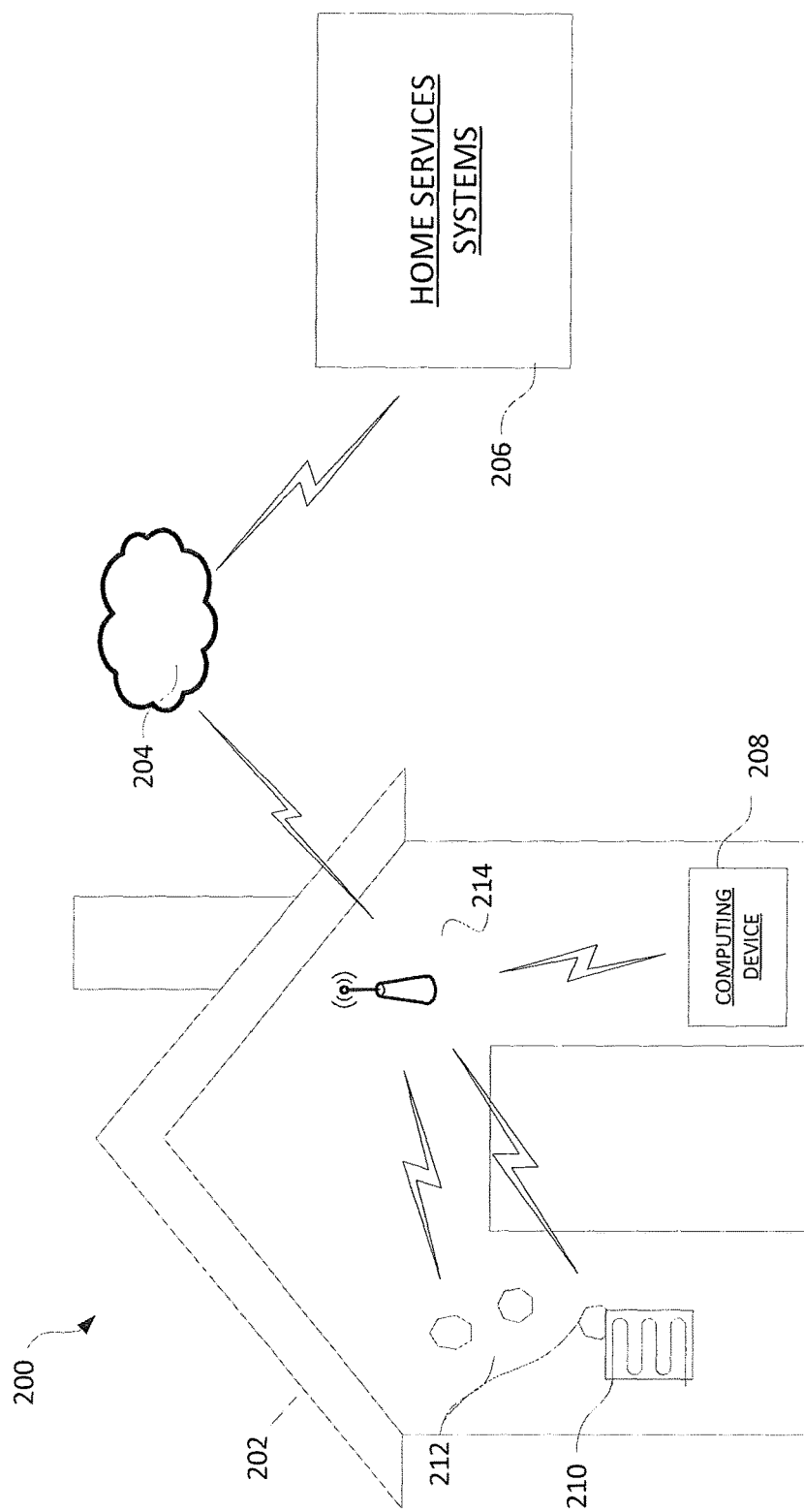
FIG. 2 is an example of a home services system illustrating various communications between a home (e.g., home systems, devices, etc.), one or more computing devices, and the home services system, according to one or more aspects of the disclosure.

FIG. 2 is a schematic illustration of a home services system arrangement according to one or more aspects described herein. As shown in FIG. 2, the arrangement 200 may include a home 202. The home 202 generally includes a variety of features, appliances, and/or devices 210 that may require service or replacement such as, but not limited to, a roof, driveway, sidewalk, gutters, windows, siding or other exterior covering, appliances, such as a dishwasher, washing machine, dryer, refrigerator, stove, etc., plumbing, heating/air condition (HVAC) systems such as furnaces and heat pumps, water heaters, sump pump, electrical systems, and smoke detectors. In addition, services may be additions such as, but not limited to, a deck, a porch, a garage, a bedroom, a family room, a studio, or a shed.

In some examples, home services system 206 may receive data associated with the home 202 via wireless network system 214 though network/internet 204. The data may include general data associated with the home, such as age of home, building materials used in the home, whether there are fireplaces or wood stoves, type and age of appliances within the home, and the like. The data may further include neighborhood information, temporal (seasonal) data regarding the area, and claims information for similar homes in the area. Information associated with the user or owner of the home may also be received by the system 206. Data may also include data from various sensors in the home which may transmit the data in real-time such as sensors 212 in or near furnaces, water heaters, entrance doors, air conditioners, smoke detectors, carbon monoxide detectors, security systems, and various appliances. Such sensors 212 may be any suitable sensors for a device, for example, furnace sensors may include a flame sensor, carbon monoxide sensor, low fuel level sensor, ignitor sensor, and temperature sensor, or water heater sensors may include a flame sensor, ignitor sensor, leak sensor, and temperature sensor. For example, the sensor may provide data of flame status, carbon monoxide count, fuel level, ignitor status, home occupancy status (home occupied or empty at a given time with the motion detection sensor over a period of time), and temperature reading. Accordingly, the home services system 206 may determine, based on the received information including sensor data, recommended services or products for the home. For example, a service may be to clean a flame sensor. The services may be based on features particular to the home (e.g., age, type of materials used, etc.) as well as aggregated data for similar structures or similar systems (e.g., insurance claim data).

In some examples, the recommended services may be transmitted to a computing device, such as an in-home or mobile computing device 208. The computing device 208 may be one or more user computing devices (e.g., laptop, tablet, smart phone, etc.) and may be configured to display the recommended services as well as various other features and/or aspects discussed herein.

The home services system 206 may track the services including repairs, replacements, and additions performed on the home. Accordingly, as recommended services are completed, they may be marked completed by the system and completion of one or more items on the services list may generate incentives for a user. That is completion of one or more services may result in, for example, tokens placed into an account of the user or a discount for future services. The tokens may, in some examples, remain with the user when selling the home and buying a new home.

Figure 3:
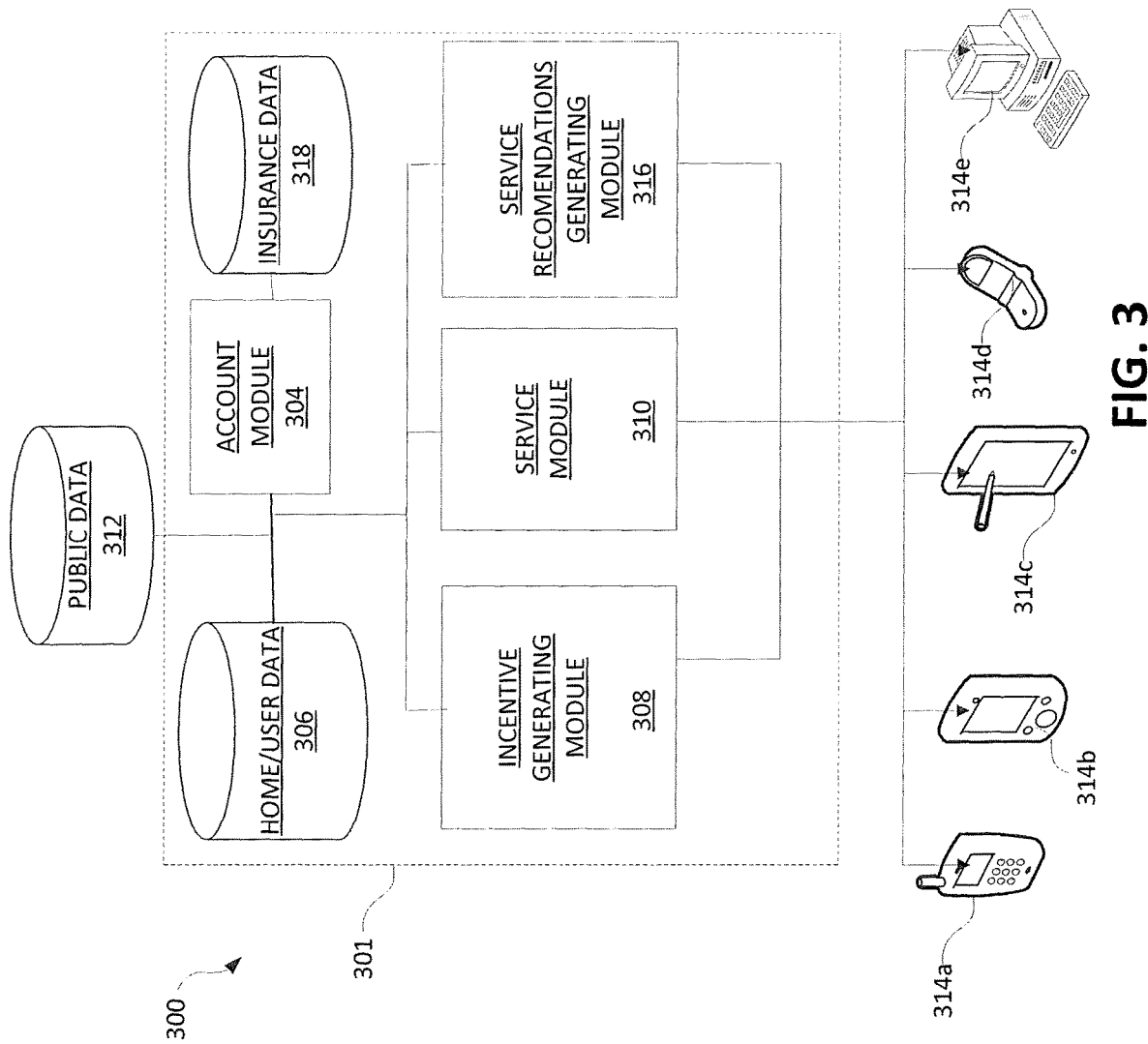
FIG. 3 is an example home services system according to one or more aspects of the disclosure.

FIG. 3 is a schematic diagram of an illustrative home services system 300 (e.g., system 206 from FIG. 2). The home services system 300 may be associated with, internal to, operated by, or the like, an entity, such as a home services company, an insurance provider, or other monitoring service or system operator. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The home services system 300 may include one or more modules that may include hardware and/or software configured to perform various functions within the system 300. The one or more modules may be separate, physical devices or, in other examples, one or more modules may be part of the same physical device. Further, each module may include specific hardware and/or software configured to perform various functions within the system 300, as will be discussed more fully below.

The home services system 300 may include a service module 310. The service module 310 may include hardware and/or software configured to perform various functions within the system 300. For instance, the service module 310 may receive data associated with a home and/or user. The data may include types of systems and/or devices within the home (e.g., list of appliances, list of systems/features, etc.). The received data may further include make and/or model of appliances, serial number of the appliance, age of system/device, type of material(s) used in building, etc. The received information may further include information associated with the user or owner of the home (e.g., name, contact information, insurance information, etc.). The data may be received from various sources including a home/user data base 306 (which may include information from one or more insurance sources), one or more publicly available sources 312 (e.g., publicly known information about certain systems or devices), data from various sensors associated with the home such as temperature sensors, motion sensors, water leak sensors, water flow sensor, humidity sensors, smoke detection sensors, water sensors, or chemical detection sensors, or sensors (e.g. 212 in FIG. 2) associated with appliances in the home, and/or from user input received via one or more computing device, such as computing device 314a-314e. For example, data may be taken from home inspection, home checkup or self-inspection reports. Other data may include third party data such as weather/climate reports, geography reports (e.g. seismic events), and permits (maintenance/upgrades).

The service module 310 may receive data associated with a self-assessment (also known as self-inspection) by the user by providing a platform to the user to provide information about the home that is not publicly available or available from insurance information, for example.

Based on the information/data collected by the service module 310, risk indicators may be assessed to build predictive risk models. Specific risks for one or more perils can be identified in a home and personalized recommendations generated to prevent or mitigate those risks. These perils can be related to water, electrical fire, appliance leak (for appliances such as washing machine and dishwasher), pipe bursts from freezing, weather, pipe bust/leak due to plumbing issues, water heater leak/burst etc. Historical data may be used to understand attributes in the homes that have specific claims.

Based on the information collected by the service module 310, a service recommendations generating module 316 may generate a personalized list of recommended services for the home. The recommended services may be generated based on the received information associated with the home and information aggregated from various other homes and/or structures, similar systems, devices, etc. For instance, the system may receive aggregated data associated with one or more insurance claims from a data base, such as insurance data base 318. The information may include data associated with type of device or system, age, type of repairs, usage time before replacement, wear factors associated with building materials, and the like. By comparing the systems, devices, etc. associated with the home with the aggregate data for similar systems and/or devices, the service recommendations generating module 316 may identify one or more services that should be performed. Some examples of recommended services may include replacement of a roof, window replacement, and service or replacement of appliances such as water heater, refrigerator, sump pump, washing machine, dryer, dishwasher, freezer, air conditioner, furnace, and the like. In some examples, the service recommendations generating module 316 may also prioritize the recommendations (e.g., based on urgency, best return on investment, etc.) Some examples of recommended services may include renovations such as remodeling (modernizing) a kitchen or additions such as a garage, a bedroom, a family room, or a porch or deck. Such recommendations may be based on a change in family status such as elderly family members moving in or birth of children, or may be based on renovations and additions being made to similar homes in the area in order to maintain or increase value in the home.

Once a list of recommended services has been generated, the list may be transmitted to a user, such as via one or more computing devices 314a-314e. For instance, the services list may be transmitted to a smart phone 314a, personal digital assistant (PDA) 314b, tablet 314c, cell phone 314d, or other computing device 314e, of the user.

The recommended services may also be forwarded to the incentive generating module 308. The incentive generating module 308 may be connected to or in communication with one or more other modules within the system 300 and may include hardware and/or software configured to perform particular functions within the system 300. For example, the incentive generating module may provide a list of providers for the various services and discounts for using such providers. The providers may be obtained via Angie's List for example, and tailored to the type of work and location of the home. The incentive generating module may forward the providers and discounts to the user such as via one or more computing devices 314a-314e.

The incentive generating module may match experts for services recommended for the home and transmit clickable links to the user via one or more computing devices 314a-314e. For instance, the system may automatically match experts for the a service based on information from the home such as sensor data, make and model of appliances, type of service or replacement to be performed. At least one clickable link may be generated for on-demand access to the experts for the service and provided to the computing device for access by the expert.

Upon determining by the service module 310 that a service has been completed, the completed service information may be transmitted to the incentive generating module 308. For instance, based on the service completed, a token (cash, credit, points that may be used to purchase products in the account), incentive, or discount for future products or services may be generated for the user. The token, incentive, or discount for future products or services may be deposited in a home services account associated with the user and stored in account module 304.

The token or discount for future products or services may be determined by the incentive generating module 308 based on the service itself. For instance, replacement of a roof may result in a deposit of a certain token quantity, while cleaning of gutters may result in a different token quantity being deposited in the user account. Alternatively, an incentive may be, for example, replacing a roof at a discounted price and an incentive may be that, if a roof is replaced, a service for free or discounted gutter cleaning for one year may be provided. In some examples, the services may be associated with different tier levels which may result in different token quantities being awarded to the user. For instance, tier 1 services may include roof replacement, window replacement, addition of whole-house generator, or the like. These types of services may result in a greater number of token quantities than tier 2 tasks, which may include items such as refrigerator water line or dishwasher replacement, and the like. While these two tiers are provided as examples, additional tiers having additional or differently arranged tasks may be used without departing from the invention.

In some examples, the incentive generating module 308 may generate discounts or incentives on future purchases such as a discount on a subsequent or related service. For example, upon purchase of certain products or services, the user may receive 5% or 10% of the purchase price in their home services account for use with subsequent purchases.

Figure 4:
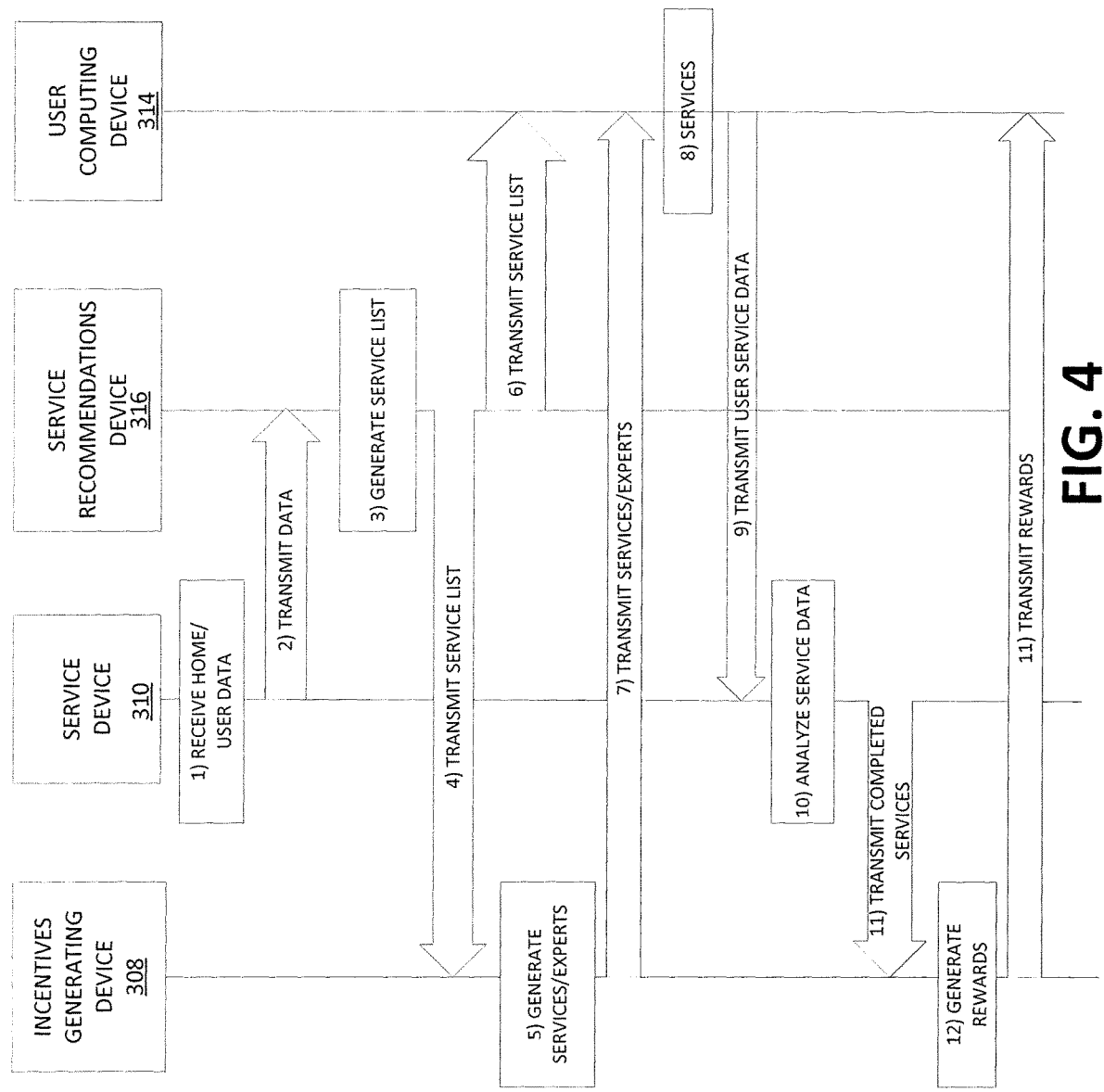
FIG. 4 is an example event sequence illustrating a process associated with the home services system, according to one or more aspects of the disclosure.

FIG. 4 depicts an illustrative event sequence for utilizing the home services system in accordance with one or more aspects discussed herein. The example shown in FIG. 4 is merely one example sequence and various other steps, processes, or the like, may be included in a sequence without departing from the invention.

In step 1, home and/or user data may be received at, for instance, a service device 310, such as service module 310 in FIG. 3. The data may include types of systems and/or devices within the home, ages of the devices and/or systems, materials used in building the home, user name, contact information, insurance policy information, and the like. The data may further include data from at least one sensor that transmits in real time to the service device. In step 2, data is transmitted to a service recommendations device 316, such as service recommendations module 310 in FIG. 3.

The services recommendation device can aggregate all of home-related data at an address level, for example historical policy and claims data, as well as many third party data sets about homes, geography, weather, permits, MLS, etc. that provide an understanding of a home. Data may include data that the homeowner has shared such as a home inspection report or data from a home checkup.

In step 3, a services list may be generated by the services recommendations device. The services list may be prioritized such as by safety, cost, or most added value to the home. For example, data transmitted from a fuel sensor in a furnace may indicate the fuel is low and a service list is immediately generated indicating that fuel must be purchased.

In aspects of the invention, the home services system can produce recommended services in three ways:

1) Based on knowledge of the features of the home from static data sources. For example, from the MLS, it is known that the house features a fireplace; therefore it is recommended that a user have the fireplace checked every two years. If the user indicates he has already serviced the fireplace, this recommendation would disappear. (If feature X exists, recommend service Y at Z intervals).

2) Based on home services data. For example, predictive risk models from historical claims may be created which will score each home for risk of specific perils occurring. For example, from historical analytics that homes with features X and Y are at a particular risk for an electrical fire, then these variables are used in an electrical fire predictive risk model. This model is used to score a particular home for the likelihood of an electrical fire occurring. If that home has a high risk score, it is then recommended that the wiring be evaluated or amperage of the fuse box increased. (If the risk score is "high" for a given home, recommend X service to prevent the risk)

3) Based on knowledge of the current risk state from dynamic data sources. Risk models can be combined with dynamic data sources to detect or predict changing conditions inside the home, assess contextual risk, and generate real time recommendations in response. For example, if a home has been scored as high risk for a pipe burst from freezing using the home services risk models, and it is known that the weather in the area is currently below freezing, and it is known from sensor data that no one has been home for several days and water has not been running, it may be recommended to run water in the pipes immediately to prevent a pipe burst. Alternatively it is detected that water is flowing in an unusual pattern and no one is in the home, an automatic water shutoff valve could be actuated to mitigate the damage of a burst pipe. (If the risk score is "high" or if the home has X known features, and Y conditions exist inside or outside the home, generate Z recommendations or interventions to mitigate the risk.)

In step 4, the services list may be transmitted to an incentive generating device 308. For example, in the case of a furnace, the list may include cleaning the furnace. In step 5, lists of discounted products and services are generated to encourage completion of the services.

The recommended service is cross-checked with a list of approved service providers who perform this service. For example, of providers who offer that service, results may be filtered by proximity to the house. If the recommended service falls into a category ("electrical", "plumbing"), service providers are then filtered by that category. Service providers in that category are again filtered by proximity to the home address. Of those service providers within a given distance, the list is cross checked with the list of pre-negotiated service offers that exist. These offers would be set up and agreed to with individual service providers when they are added to the list (e.g., HVAC Tune Up for $79, Two Hours of Handyman Time for $100, etc.) If any of the service providers in the filtered list have an existing offer that matches the recommended service, they appear as one of the offers for the consumer to choose from.

In step 5, experts are associated with services and clickable links are generated to access the experts. In the example of a fuel sensor, an experts associate with the type of furnace and/or the types and sources of fuel available including quality and cost of the types of fuels.

In step 6, the services list may be transmitted to the user computing device. In step 7, the service incentives and clickable links to experts are available to the user such as through a digital platform that can be accessed by the user through a website or mobile app. The server generates the pages that contain the link.

In step 8, the user conducts or authorizes services to the home and/or utilizes clickable links to experts to obtain advice. In step 9, service data is transmitted to the service device 310. In step 10, the service device 310 assesses the data to determine whether a service has been completed, the quality of the service, whether the service was done by a top-rated provider and the like.

In step 11, completed service data is transferred to the incentives generating device 308 and one or more rewards may be generated. The rewards may include tokens (such as cash, credit, points) or discounts, incentives, and the like deposited in a user account associated with the home. In some examples, the discounts or incentives may be for use toward future maintenance on the home. For instance, if a roof was recently replaced, a reward for a discount on gutter cleaning may be generated for the user. The rewards may be generated based on type of maintenance task complete, expected cost of maintenance task completed (e.g., based on insurance claim or other data associated with similar repairs or replacements), and the like. In some examples, the reward may be generated by reviewing a look up table which may store various services associated with various systems and devices and may cross reference those services with related services, types of rewards, amounts of rewards, etc.

In step 8, a notification of the reward and/or deposit of tokens to a user account may be transmitted to a user computing device 314. Accordingly, the user may be aware of the noted completion of the service and associated deposit of a reward to the user's account.

The home services system may be used to encourage binding insurance by providing incentives. For example, when a user purchases a home and considers binding their insurance, the service module analyzes information regarding the user and the home and puts a certain amount of money into a home services account for the user to utilize to purchase products or services if the user binds the insurance. For example, the service module may be used analyze whether the user does not have particular products (e.g., smoke detectors) and encourage purchase of such products. The system may offer the products to the user for free or at a reduced rate upon binding insurance. Premium home insurance policies may provide a free membership to the home services account, as well as a $50 bonus credit initially and at each renewal.

In addition to a time of initial purchase of a home, the system may offer incentives at meaningful points in time in the lifecycle as a homeowner such as at renewal periods, at retirement, or when a child is born or adopted. For example, a $50 bonus credit and/or discounts for installing safety rails or child protection devices purchased from the home services account.

The system may further offer expert, trusted advice on how to care for their home and specific, personalized improvement and maintenance lists, and personalized offers to complete the improvements and maintenance items.

Instead of part of an insurance package, for example, the home services account may also be available for a fee (e.g. $50). Those that pay for the home services account may not receive a $50 bonus credit that someone may receive if the home services account is provided as part of an insurance package. However, such users may still earn credits and discounts by utilizing services and products offered by the home services account. This fee-based home services account may also offer expert, trusted advice on how to care for their home and specific, personalized improvement and maintenance lists, and personalized offers to complete the improvements and maintenance items.

There may further be a free version of home services account where services and products are offered but the user may not earn credits or have access to special services such as experts.

The home services system can develop loyalty among high value customers by rewarding them with products and services for their home, creating a positive relationship by adding value, for example for insurance companies, adding value beyond purchasing of insurance, and incentivizing preventative home maintenance. The home services system can further provide an affirmative way of quantitatively assessing whether a repair has been satisfactorily completed.

Figure 5:
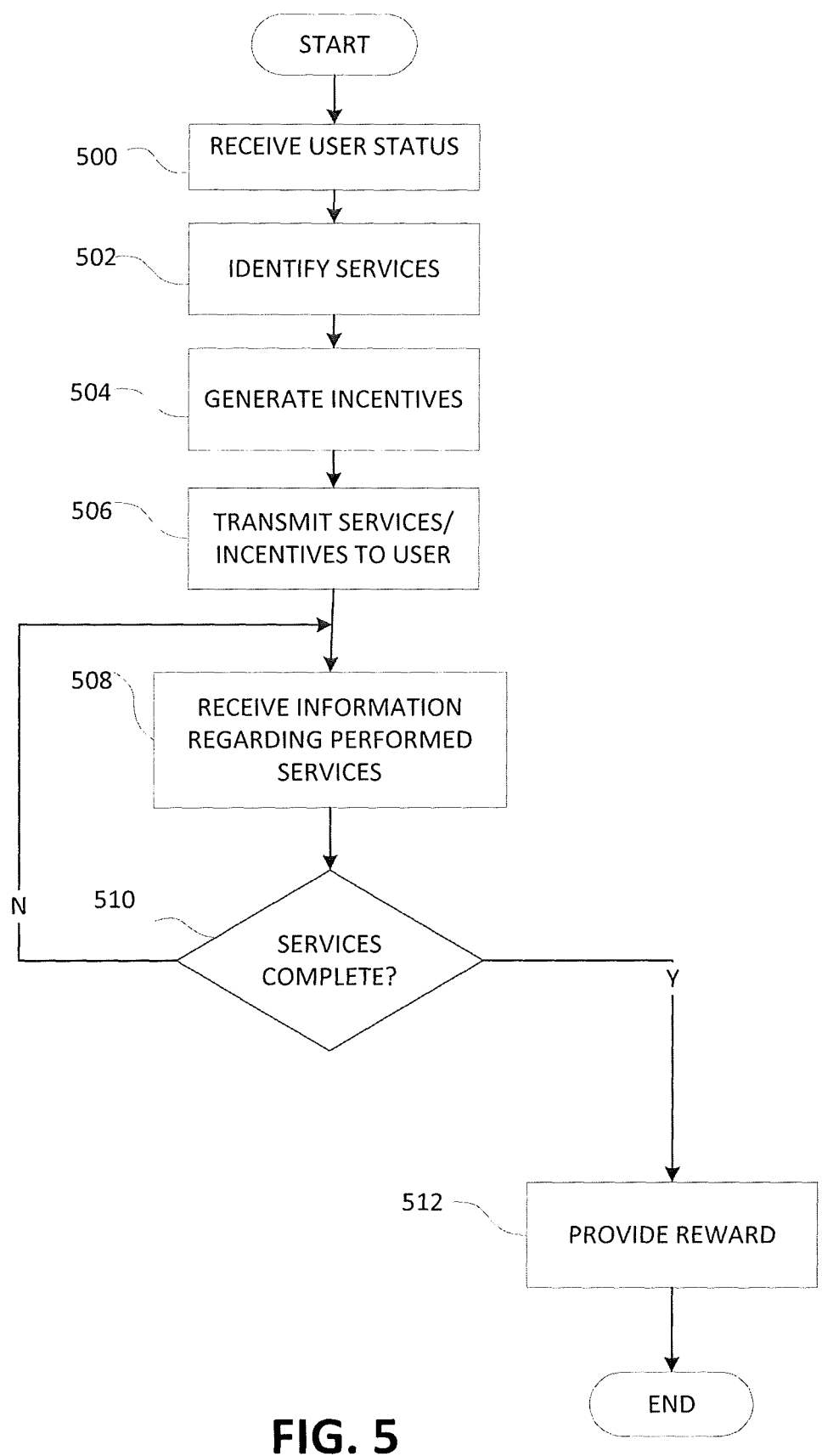
FIG. 5 is a flow diagram illustrating one example method of generating a service list, generating incentives, determining whether one or more services have been completed, and providing rewards for completion according to one or more aspects of the disclosure.

FIG. 5 depicts an illustrative algorithm and event sequence for utilizing the home services system in accordance with one or more aspects discussed herein. The example shown in FIG. 5 is merely one example sequence and various other steps, processes, or the like, may be included in an algorithm or sequence without departing from the invention.

FIG. 5 illustrates one example method of generating a recommended service list, generating incentives to perform the service, determining whether one or more services have been completed, and generating a reward or future discount for services or products for a user. In step 500, home and/or user data may be received by the system. As discussed above, the home and/or user data may include features of the home such as devices or appliances, age of systems/devices, building materials used, features of the neighborhood, temporal (weather) data of the area, insurance information, and the like. The data may be received from one or more sensors associated with the home or a system or device within the home. Such sensor data may be provided in real-time to provide notice or indication of problems or potential problems associated with the home or system or device within the home.

In step 502, the system analyzes the data related to the user's home, similar homes, homes of other users (e.g. other insured customers), and provides suggestions for services (including products) to improve the home. A service list may be generated for the user. The service list may include one or more recommended services, as well as information regarding the service such as anticipated cost, added value or sales price to the home or priority of service.

In step 504, incentives for completing the service are generated and placed in a home services account. Such incentives may include a free membership to Angie's list or discounts for services or token that can be used for a service or product. In step 506 the recommended improvement list and incentives for completing the service are forwarded to the user. Such incentives may include a clickable link to experts associated with the services. The user may use the clickable link to contact experts for advice on completing the services.

In step 508, data related to completed service may be received. Such information may be received from the user or may be received from the contractor or service provider that completed the service. Alternatively, information regarding a completed service may be received from an agent visiting the home. In some examples, the maintenance data may include data received from the one or more sensors associated with a system or device within the home.

In step 510, a determination may be made as to whether one or more services have been completed. This step may provide an affirmative way of quantitatively assessing that a repair has been satisfactorily completed If not, the system will return to step 508 to receive additional service data. If one or more services have been completed, in step 512, a reward or future discount may be deposited into the home services account associated with the user.

The home services account may also be used by the user to buy products or services. That is, in addition to rewards or incentives, home services account may provide products such as smoke detectors which may be offered to the user for free or at a reduced rate. The home services account may provide other home products or services though the account such that if the user purchases these products or services though the account, the user receives 5% or 10% of the purchase price in their home services account for use with subsequent purchases.

Figure 6:
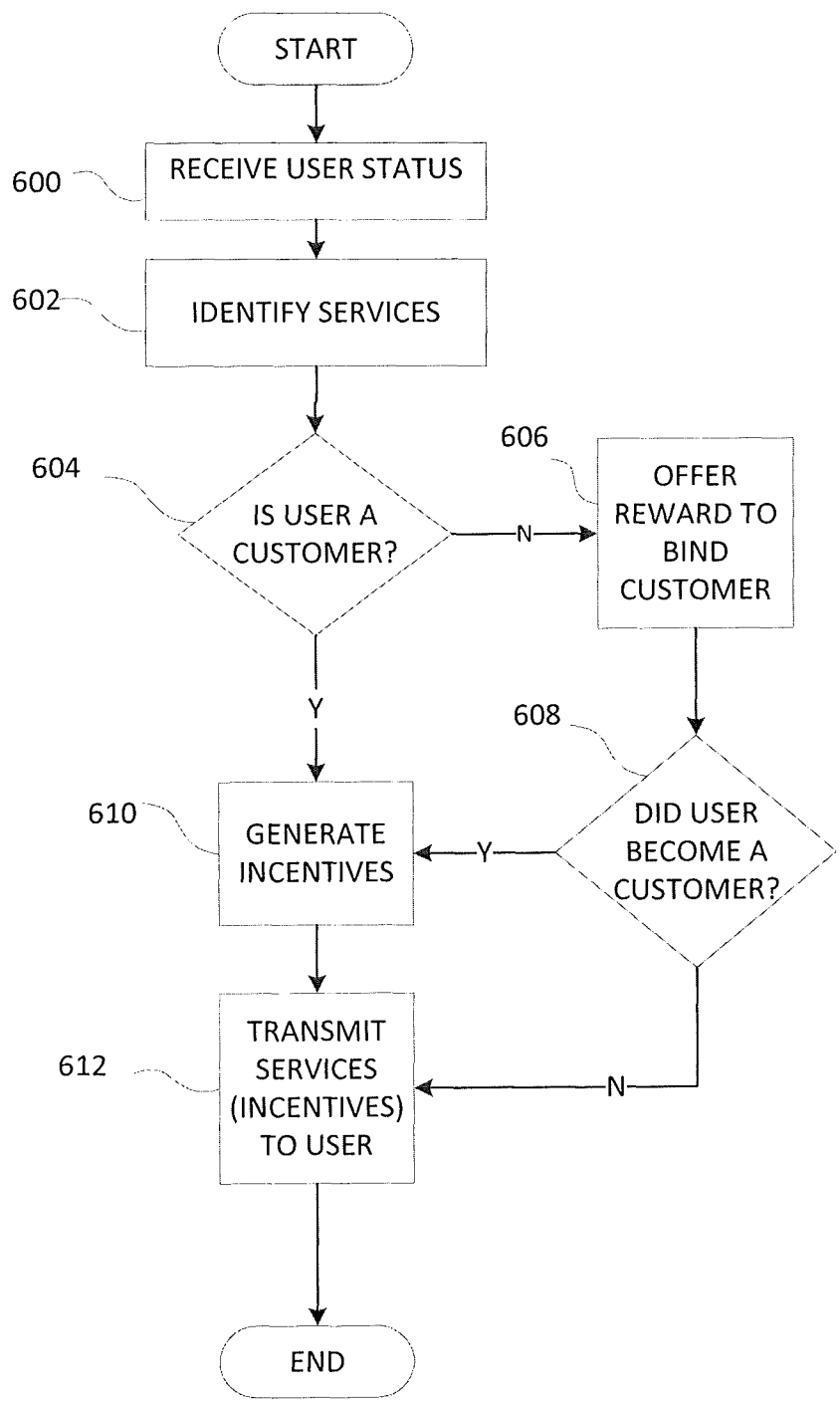
FIG. 6 is a flow diagram illustrating one example method of generating a service task list, determining whether the user is a customer, offering a reward to bind a customer, generate incentives for customers, according to one or more aspects of the disclosure.

FIG. 6 depicts another illustrative algorithm and event sequence for utilizing the home services system in accordance with one or more aspects discussed herein. The example shown in FIG. 6 is merely one example sequence and various other steps, processes, or the like, may be included in an algorithm or sequence without departing from the invention.

FIG. 6 illustrates an example method of generating a recommended service list, and generating incentives to bind as a customer and incentives to perform services. In step 600, home and/or user data may be received by the system. As discussed above, the home and/or user data may include features of the home such as devices or appliances, age of systems/devices, building materials used, features of the neighborhood, temporal (weather) data of the area, insurance information, and the like as well as data received from sensors within the home.

In step 602, the system analyzes the data related to the user's home, similar homes, homes of other users (e.g. other insured customers), and provides suggestions for services (including products) to improve the home. A service list may be generated for the user. The service list may include one or more recommended services, as well as information regarding the service such as anticipated cost, added value or sales price to the home or priority of service.

In step 604, the system determines whether the user is a customer. If the user is a customer, in step 610, incentives are offered in a home services account to complete suggested services or improvements. Such incentives may include a free membership to Angie's list or discounts for services or tokens that can be used for a service or product. Such incentives may further include a clickable link for expert advice. In step 612 the recommended improvement list and incentives for completing the service are forwarded to the user.

If the user is not a customer, in step 606, the system offers a reward to the user to become a customer. For example, the system may offer a $50 credit or cash to become a customer. In step 608, the system determines whether the user became a customer. If the user became a customer, in step 610, the reward is credited to the home services account and incentives for completing the service are generated and placed in a home services account. Such incentives may include a free membership to Angie's list or discounts for services or token that can be used for a service or product. Such incentives may further be a clickable link for expert advice. In step 612 the recommended improvement list and incentives for completing the service are forwarded to the user.

If the user did not become a customer, a free version of the home account services may be offered, but with no credits or incentives. If the free version is accepted, the recommended improvement list is forwarded to the user. Although not offered, the user may be provided with incentives should the user change his mind and become a customer.

As an example of the algorithm of FIG. 6, a user purchases a home and considers binding their insurance. The home services system analyzes particular information regarding the user and the home and indicates a certain reward (e.g. cash) that the user will receive if they become a customer. The user becomes a customer, and the reward is placed in the home services account for the customer. The user is provided a list of recommended services and products for the new home and offers incentives to the user such as discounts on services and products.

FIG. 7A depicts a possible interface 700 for a new homeowner. An email or other communication is sent to a potential customer promoting the benefits of the home services account. The email may include a personal message to the homeowner 702 and may offer products and/or services available in the home services account 704.

FIG. 7B depicts a possible interface 710 for a new customer. An email or other communication is sent to the customer notifying of the $50 bonus for joining the home services account. The email may include a personal message to the homeowner 712 and offers products and services 714 including credit incentives to be applied to future purchases available in the home services account.

FIG. 7C depicts a possible interface 720 for a homeowner that is not a customer. An email or other communication is sent to the homeowner providing advice regarding the roof. The email may include a personal message to the homeowner 722 and options for repair or replacement 724. Also included may be an offer extended to existing customers for roof replacement including a credit incentive to be applied to future purchases as an enticement to the homeowner to bind insurance or purchase the home account service.

FIG. 7D depicts a possible interface 730 for a homeowner that is a customer. An email or other communication is sent to the customer providing seasonal advice. The email may include a personal message to the customer 732 and offers for products and services 734 including credit incentives to be applied to future purchases.

Figure 7E:
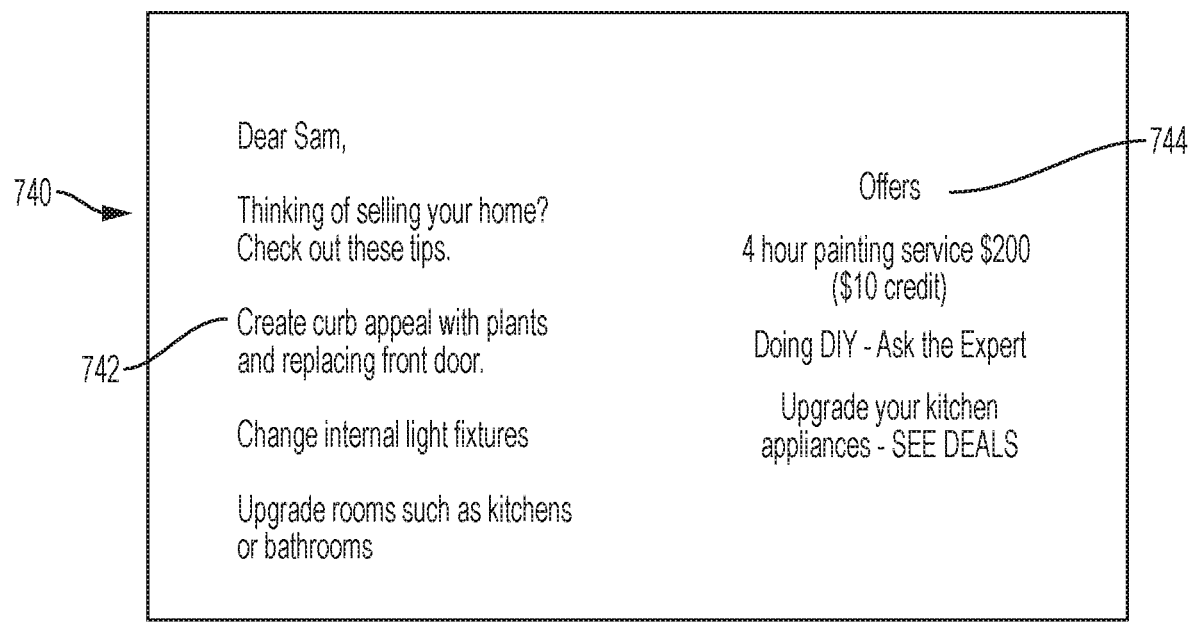
FIG. 7E is another example user interface for displaying an example message and offers to a customer, according to one or more aspects of the disclosure.

FIG. 7E depicts a possible interface 740 for a homeowner that is a customer. An email or other communication is sent to the customer providing advice regarding selling a home. The email may include a personal message to the customer 742 and offers for products and services 744 including credit incentives to be applied to future purchases.

Figure 9:
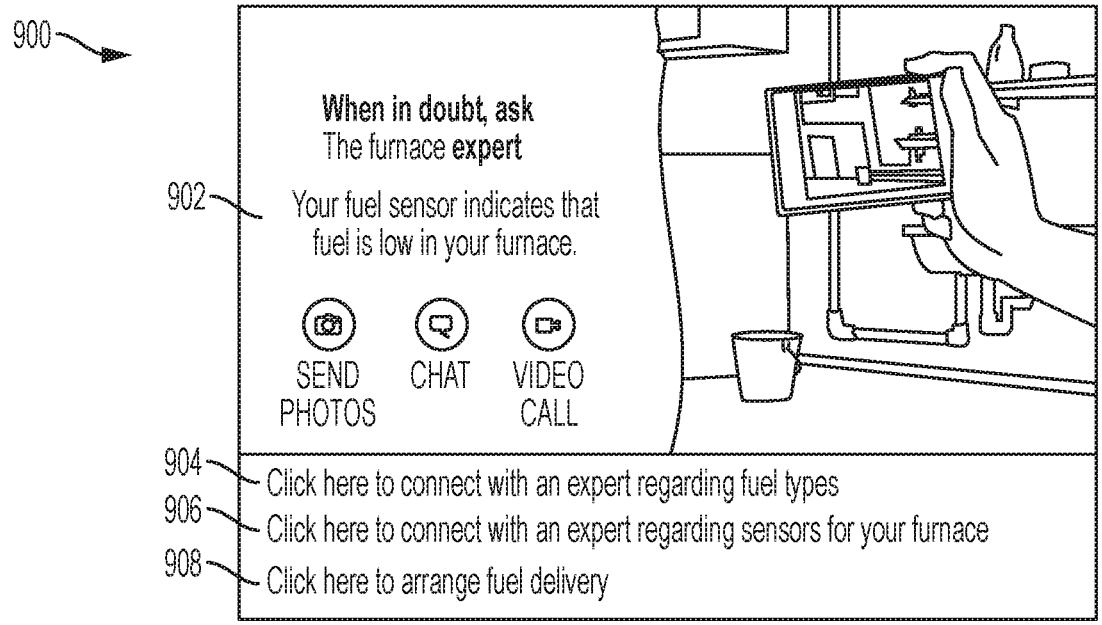
FIG. 9 is an example of a possible screen shot to provide expert advice to a user

The interface depicted in FIG. 7E may further contain a clickable link to an expert page which allows a user to connect with an expert. A user interface 900 for an expert is shown in FIG. 9. The interface may indicate the status of a sensor 902, for example, a furnace sensor may indicate that the fuel is low. The interface may provide options for linking to an expert. For example, if a user is unsure what type of fuel to order, the user may click on a clickable link 904 to connect with an expert in types of fuels fuel. On the other hand, the user may note that the fuel reservoir was just filled so there may be an issue with the fuel sensor. The interface may provide a clickable link 906 to experts in sensors for the make and model of the user's furnace. The interface may further provide a clickable link 908 to arrange fuel delivery. As further shown in FIG. 9, there may be options for the user to communicate with an expert by on-line chat services or video call; however, any suitable means of communication are contemplated including telephone, mail, email, texting, or a URL link to the expert. The communication may further be an improved telephone in the connected home that communicates with the in-home computing device and/or the furnace to help the homeowner automatically call the right expert for help.

The aforementioned improved telephone may be part of a technological system for home servicing including sensors, computing devices, and real-time communication devices. In one example, the improved telephone may be embodied in an application executing on a user's smartphone to provide real-time communication capabilities with an expert of particular home servicing. For example, the sensors 212, appliances 210, and computing devices 208 described herein may communicate with a remotely-located expert through a real-time communication channel. The application on the user's smartphone may be customized in real-time based on the sensor data and other information provided through the devices connected to the home network 214. As such, when the user needs assistance, he/she may simply activate/trigger the application to create a real-time communication channel (e.g., an online chat, a voice conversation, or other live interaction) with an expert. Unlike existing systems that might require a user to dial a telephone number and interact with either an automated or human operator to redirect their call to the appropriate knowledgeable expert, the smartphone application described herein has already been modified and/or customized to contact the appropriate expert based on the collected sensor data and other information. In some examples the smartphone application installed on the user's phone may be configured and modified by a remote home services system 206. The remote home services system 206 may update one or more configuration files of the smartphone application accordingly. Alternatively, the improved telephone may be embodied in the aforementioned clickable link 904.

The clickable link 904 to connect with an expert can be embedded wherever appropriate. Two aspects are described below:

1) Within a recommendation for a home service or product, such as 900 and 902 that indicate the fuel is low in the furnace and they should have it serviced. That recommendation is tagged with metadata that indicates what category of service it refers to, in this case, HVAC. This metadata tag of category of service is how that recommendation is matched to service providers who could provide that service. The metadata tag is also used to access available experts with expertise in that category (e.g., HVAC). Experts available for real time telephone, video, or chat dialogue could come from a preferred network of service providers, or they could be a dedicated group hired for the purpose of fielding these real time dialogue requests.

2) Within a general "Ask An Expert" feature in the interface that is not tied to a recommendation for a service or product. In this case, if the user clicked on the "Ask An Expert" tool, they would be prompted to select which metadata category applies to their question. That category would be used to filter and select the right expert, as described above. When the expert connects to the user through the application, he or she would have access to the home's relevant data through the interface, including appliance models, sensor data, known issues or risks, previous maintenance completed, etc., in order to give more specific, relevant advice.

Figure 8A:
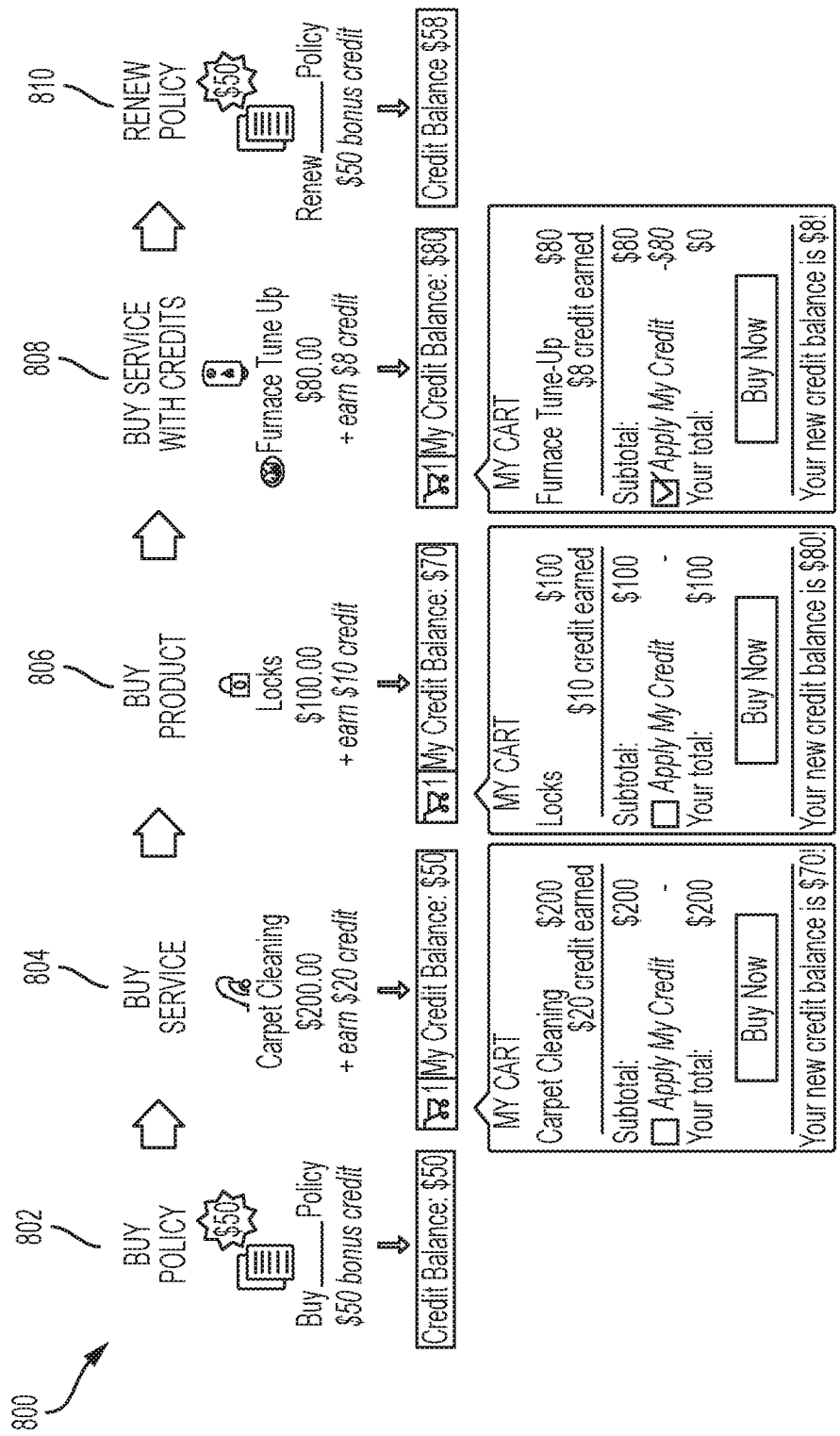
FIG. 8A is an example of a timeline that may be used to bind a customer and provide offers and incentives for purchases of products and services.

FIG. 8A provides a possible timeline 800 for an insurance customer. In step 802, a homeowner buys a policy and receives a $50 credit to future purchases of products or services. In step 804, the homeowner buys a carpet cleaning service for $200 and receives a $20 credit bringing the total credit for the homeowner to $70. In step 806, the homeowner buys locks for $100 and receives a $10 credit bringing the total credit for the homeowner to $80. In step 808, the homeowner buys a furnace tune-up for $80 and applies the $80 credit to make the purchase. The homeowner receives an $8 credit bringing the total credit for the homeowner to $8. In step 810, the homeowner renews the insurance policy and receives a $50 credit bringing the total credit for the homeowner to $58.

Figure 8B:
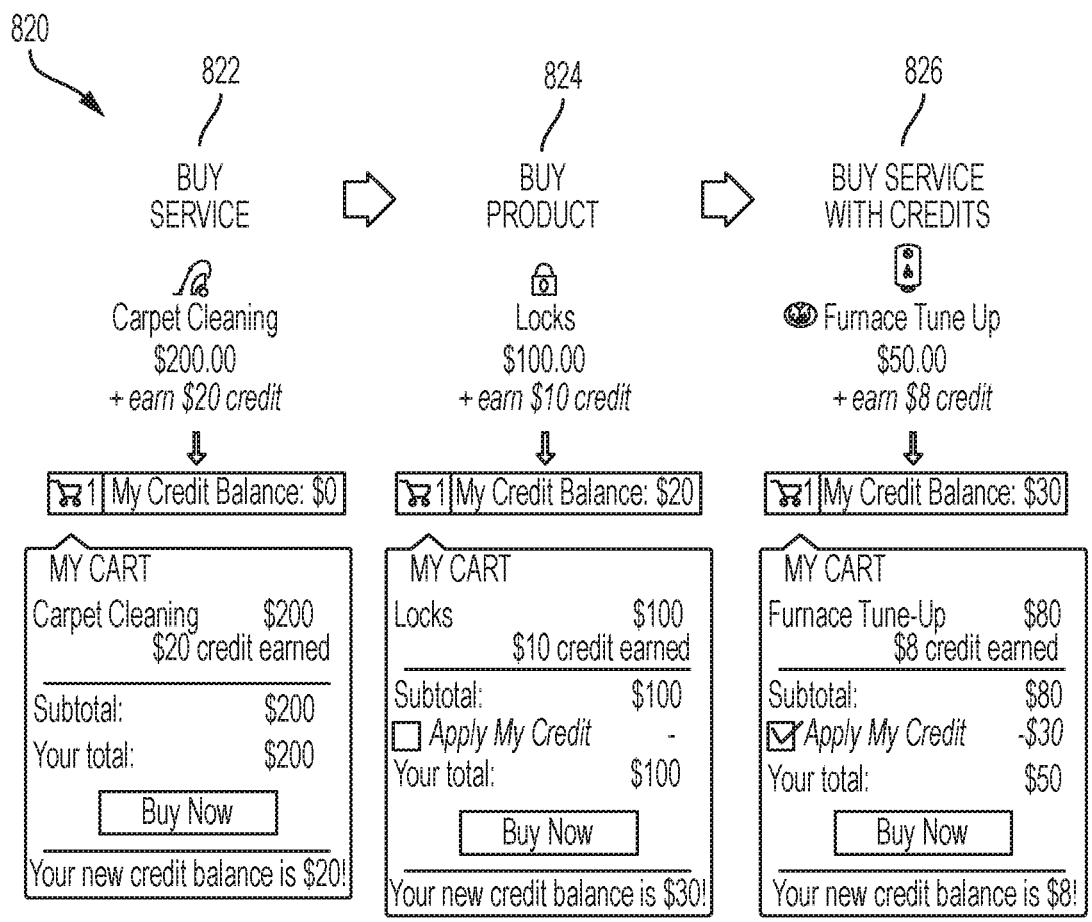
FIG. 8B is an example of a timeline that may be used for a non-customer to provide offers and incentives for purchases of products and services

FIG. 8B provides a possible timeline 820 for non-insurance customer that purchased the home services account. In step 822, the homeowner buys a carpet cleaning service for $200 and receives a $20 credit. In step 824, the homeowner buys locks for $100 and receives a $10 credit bringing the total credit for the homeowner to $30. In step 806, the homeowner buys a furnace tune-up for $80 and applies the $30 credit to make the purchase and pays the $50 difference. The homeowner receives an $8 credit bringing the total credit for the homeowner to $8.

A homeowner may use credits in their home services account after they sell their home and buy a new home. The home services account may be used to assess whether improvements or upgrades will increase the value or selling price of a home.

A further aspect relates to providing a home valuation based on improvements or upgrades to a home. In this aspect, the system provides the user with information regarding the effect home services will have on the sale price of the home. The system analyzes the features of the home, the features of comparable homes and the sale value of numerous comparable homes with and without the planned home services. The system analyzes the sale price for the comparable homes and uses that information to determine the amount a home service will likely increase the sale price of a home. The system then displays the sale price increase to the user. The projected increase can be displayed quantitatively, as a number or a number range. The projected increase also can be displayed qualitatively, such as a grade between A-F, a number between 1 and 10, or shades of color. FIG. 10 shows an example of an interface 1000 that can be shown to a homeowner listing possible home improvements 1002, the estimated cost of such home improvements, 1004 and the estimated increase in selling price 1006. Two of the listed improvements may not increase the selling price of the home, but increase the salability of the home. For example, improving garden beds may increase the curb appeal attracting would be buyers to stop at the home.

The system may automatically generate an estimated selling price for the home, estimated selling price for the home if one or more services are completed, and estimated selling price for the home upon actual completion of the services.

For example, in one aspect, a home services account system may include a home services account server including one or more processors, and at least one memory storing computer-readable instructions. The home services account receives data associated with a home including data received in real-time from at least one sensor located in the home. If the data received in real-time from the at least one sensor located in the home meets or exceeds a threshold value, the home services account server triggers an automatic analysis of selling prices of the home. An initial estimated selling price of the home is determined based on current data associated with the home including the data associated from the at least one sensor. A services list is generated for the home, including at least a first service and a second service to be performed on the home. A first estimated selling price of the home is generated if the first service is completed to the home. A second estimated selling price of the home is generated if the second service is completed to the home. A third estimated selling price of the home is generated if the first and the second services are completed to the home. The services list and the initial estimated selling price, and first, second, and third estimated selling prices are transmitted to a user device associated with the home. Data associated with services performed on the home, including data associated with one or more services on the services list and data continuously received from the at least one sensor is transmitted to the home services server. Based on the received data associated with services performed on the home and the data continuously received from the at least one sensor, it is determined whether at least one service on the services list has been completed. Based on the data regarding the services completed, an updated estimated selling price of the home is generated and transmitted to the user device associated with the home.

In an exemplified aspect, a home services system may be used to collect data from multiple homes and use such data to predict whether perils may occur in any individual home, and then monitor homes for such perils. Such perils may include, for example, water perils, fire and smoke perils, weather perils such as lightning, wind, hail, and flood, explosion, or insect damage (e.g. termites). Inefficiencies may be, for example, energy loss. The system may determine risk indicators for each peril such as abnormal operating conditions or abnormal usage patterns of home systems (determined by machine learning of the home's normal usage patterns over time). The system may be used to determine a one-time status or a real-time status of risk indicators and conditions inside the home.

Figure 12:
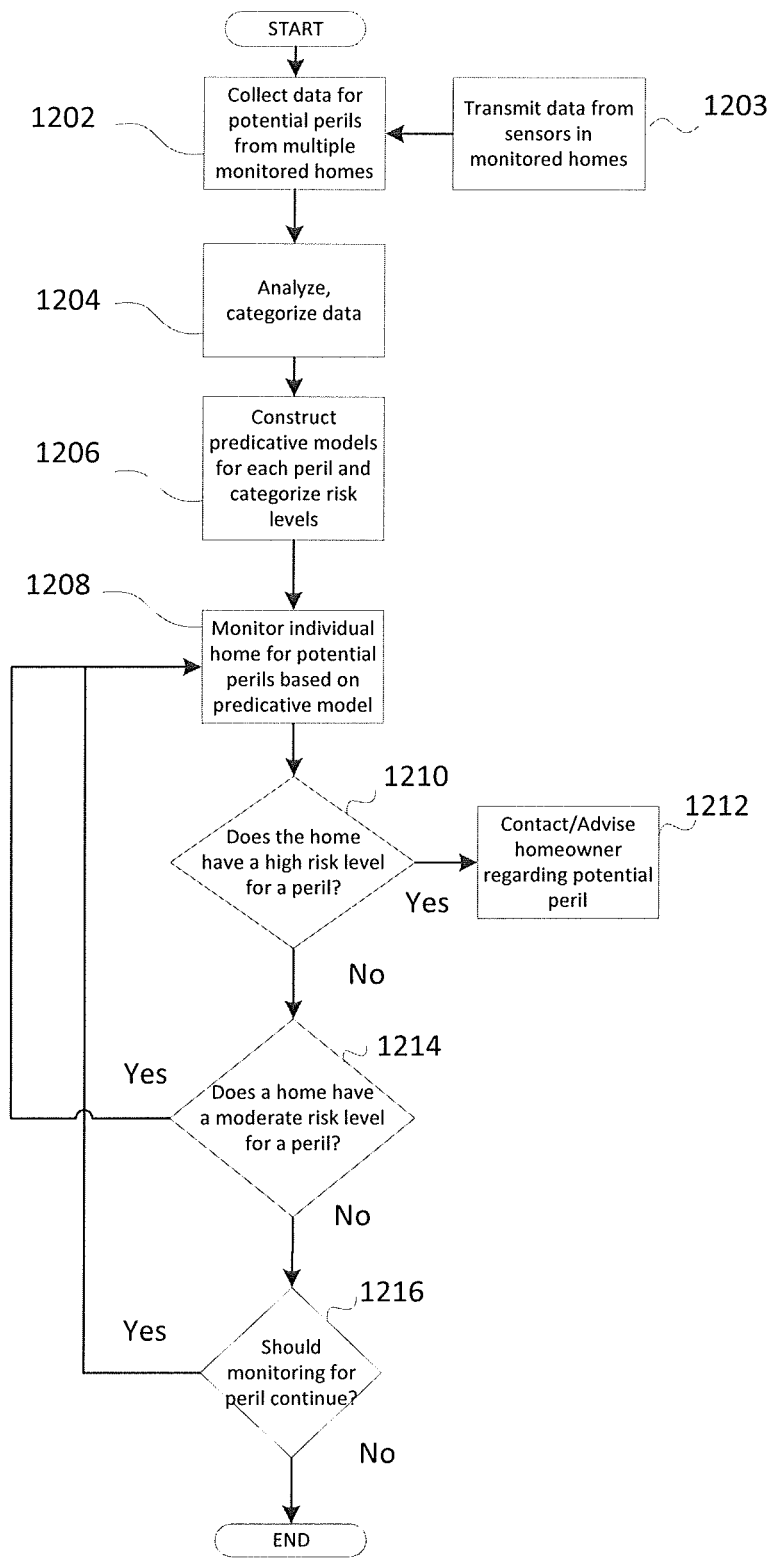
FIG. 12 is flow diagram illustrating one example method of determining whether perils exist in a home.

As shown in FIG. 12, in step 1202 the home services account system may be used to collect data from a multiple homes, e.g. 400 homes. Data may be collected from a variety of sources such as house inspection reports, home check-up reports, service reports and insurance reports. Sources may include sources of historical data related to the particular houses (including any upgrades) such as design or materials, appliances, geography, and weather. Sources may also include aggregate insurance claim and policy data relating to perils in previous claims. As shown in step 1203, data may be collected from sensors located in the home.

Data may be collected over time to measure change in conditions or risks in a home since last inspection or home checkup or claim related inspection. For example, data may be captured from periodic qualitative data from homeowners about conditions (in particular abnormal conditions) in the home, maintenance behaviors, usage, etc. that informs the risk assessment. For example, the homeowner may provide monthly quantitative and qualitative surveys. Data may be captured from sensors to monitor real time changes in usage and condition. Data may be collected from self-inspection report with images showing the conditions in the home.

In step 1204, the data is analyzed and categorized to determine trends and correlations between, for example, conditions (normal/abnormal) and perils. A baseline data model may be built based on the collected data.

In step 1206, based on the baseline data model, a predictive model may be developed for each peril or inefficiency. For example, based on the predicative model, a score or classification system (e.g. high, medium, low risk) may be set up based on probability of each type of peril occurring. Data points are identified that correlate to high-, medium- and low-risks. New risks may be identified. Profiles of homeowners and behaviors can be correlated to risk scores as well. The houses are then scored (e.g. high, medium, low risk) based on the risks.

In step 1208, individual homes are monitored for potential perils. Data may be collected over time to measure change in conditions or risks in a home. Such data may be captured from further periodic qualitative data from homeowners about conditions in the home, maintenance behaviors, usage, etc. Data may be captured from sensors to monitor real time changes in usage and condition. Sensor data may be used for additional data points as well as to validate suspected or imminent perils. The updated data may be correlated with high/medium/low risk homes from the baseline data model In step 1210, it is determined whether an individual home is at high risk for a peril, for example by determining whether certain existing conditions are abnormal. If so, in step 1212, the homeowner is contacted and provided information/advice concerning the detected peril. If there is not a high risk for a peril, then in step 1214, it is determined whether an individual home is at medium risk for a peril. If there is a medium risk, then the home continues to be monitored. If not, in step 1416, it is determined whether the home should continue to be monitored. For example, if pipes are being monitored for corrosion/rust but haven't rusted, then monitoring should continue.

All data collected from monitored homes is continually assessed by the system and the predictive models for each peril may be updated as conditions change over time and new risk variables are determined. The system provides a means to assess both static data and dynamic data to assess risk. Real time data can provide indication whether a peril or inefficiency is occurring.

The system may analyze historical, batch sensor data to learn patterns and cycles of, for example, normal water and electricity usage, and usage patterns may be correlated to other data sets. Real time (raw) sensor data may be collected and then compared against historical data to detect, for example, water flow, leak, electricity usage/surge, temperature in multiple areas, or presence/absence of a person or animal in the home.

A variety of in depth data may be gathered from multiple selected homes and any correlations observed between these data points and homes scored as high risk for one or more perils. If correlations are found, these data points could be new risk indicators for those perils. Combinations of the new risk indicators from the multiple homes could be tested and used in a predictive model to tell when a peril is about to happen or likely to happen in the near future.

In one non-limiting aspect of the invention, new risk indicators may be determined and a predictive model may be developed from both new and old risk indicators for four common water claims: pipes bursting from freezing, pipes bursting (not freezing related), appliance overflow, and water heater leak or burst.

Risk indicators for pipe bursts from freezing may be regional weather (e.g. number of days with below-freezing temperature); home construction (e.g. age, quality of insulation, pipe characteristics/locations); type of homeowner (e.g. attitude, behavior, demographic, purpose of residence); and use/condition (e.g. use of thermostat, maintenance, water consumption, home occupancy, prior claims.) The root cause of pipes bursting may be that pipes in exterior walls are exposed to cold temperatures, and standing water inside pipes freezes and expands to burst the pipe. Risk indicators for this peril may include gaps in insulation in the home, insulation type/rating, lack of adequate insulation in the home, exposed pipes in attic, crawl space or other unheated areas of the home, or critically low temperatures inside the home. Sources for data include weather stations, home inspection reports, home checkups, self-inspection reports, homeowner surveys, and sensors.

Risk indicators for pipe bursts (not from freezing) may be home construction (e.g. age, pipe age/characteristics/conditions); rust, corrosion, or leaks from the plumbing components, home renovations, type of homeowner (e.g. attitude, behavior, demographic, purpose of residence); and use/condition (e.g. use of thermostat, maintenance, water consumption, home occupancy, prior claims.). A root cause of pipes bursting may be pipes are old and/or corroded, often at the joints and/or at connections to appliances. Bad installation or heavy use can increase the risk of pipes bursting. Sources for data may include weather stations, home inspection reports, home checkups, homeowner surveys, self-inspection reports, permits and sensors.

Risk indicators for appliance overflow may be appliance condition (e.g. age, make, installation, location in home); evidence of rust or leaks from the appliance, use and conditions (e.g. water hardness, ambient temperature and humidity, frequency of use); and type of homeowner (e.g. attitude, behavior, demographic.) In absence of the data related to risk indicators a proxy can be used. For example appliance serial number and model can be used as a proxy for determining agae of the appliance. Root causes may be old or worn supply hoses that leak, or burst, or become disconnected, or are improperly installed. Sources for data may include home checkups, homeowner surveys, and sensors.

Risk indicators for water heater overflow may be appliance condition (e.g. age, make, model, installation, rust, corrosion, or leaks on or around the water heater); use and conditions (e.g. hot water setting, water hardness, ambient temperature and humidity, hot water consumption); and type of homeowner (e.g. attitude, behavior.) Root causes may be that leaks occur when a water heater is beyond expected life and the materials degrade. Sources for data may include home inspection reports, home checkups, homeowner surveys, and sensors.

Risk indicators related to electrical fires may be related to electrical wiring issues (such as spliced wires, exposed wires, loose wires etc.), electrical panel board issues also known as breaker panel issues or distribution board issues (such as double tapping, overloaded and over fused) or ground rod not connected to panel or age of the electrical panel etc.

Data related to the water and electrical perils is collected from sources such as home inspection reports, sensor reports, utility service information and homeowner input for multiple homes. Service providers may be hired to assess homes to capture risk indicator data for perils. The data is aggregated, analyzed, and models prepared. Data may be correlated to high/medium/low risk homes from the baseline model scoring. For instance, historical data is used to understand the attributes of homes that have had specific claims. Such data is analyzed with other data that may be relevant such as policy data, weather data, geography, and other third party data. A risk model is developed that can score homes for probability of having, for example, one of four types of water claims. Such risk model may take into account characteristics of homes, for example appliance models most likely to fail and when they might fail, as well as temperature "danger zones" at which pipes burst in different regions.

After an initial risk model for the water and electrical perils is set up, periodic qualitative data is captured from homeowners about conditions in the home, maintenance behaviors, usage, etc. that informs the risk assessment. Sensor data may be used to validate significant water peril events. For example, a homeowner can be contacted if an event is detected to obtain details of the event, such as a burst water pipe. Confirmed claim events can be used in the model. New risk variables can be analyzed that could be predictive of the different types of water perils. Profiles of users and behaviors can be correlated to risk scores. An analysis of how conditions change over time in a home may be made and utilized in the risk models.

Figure 11:
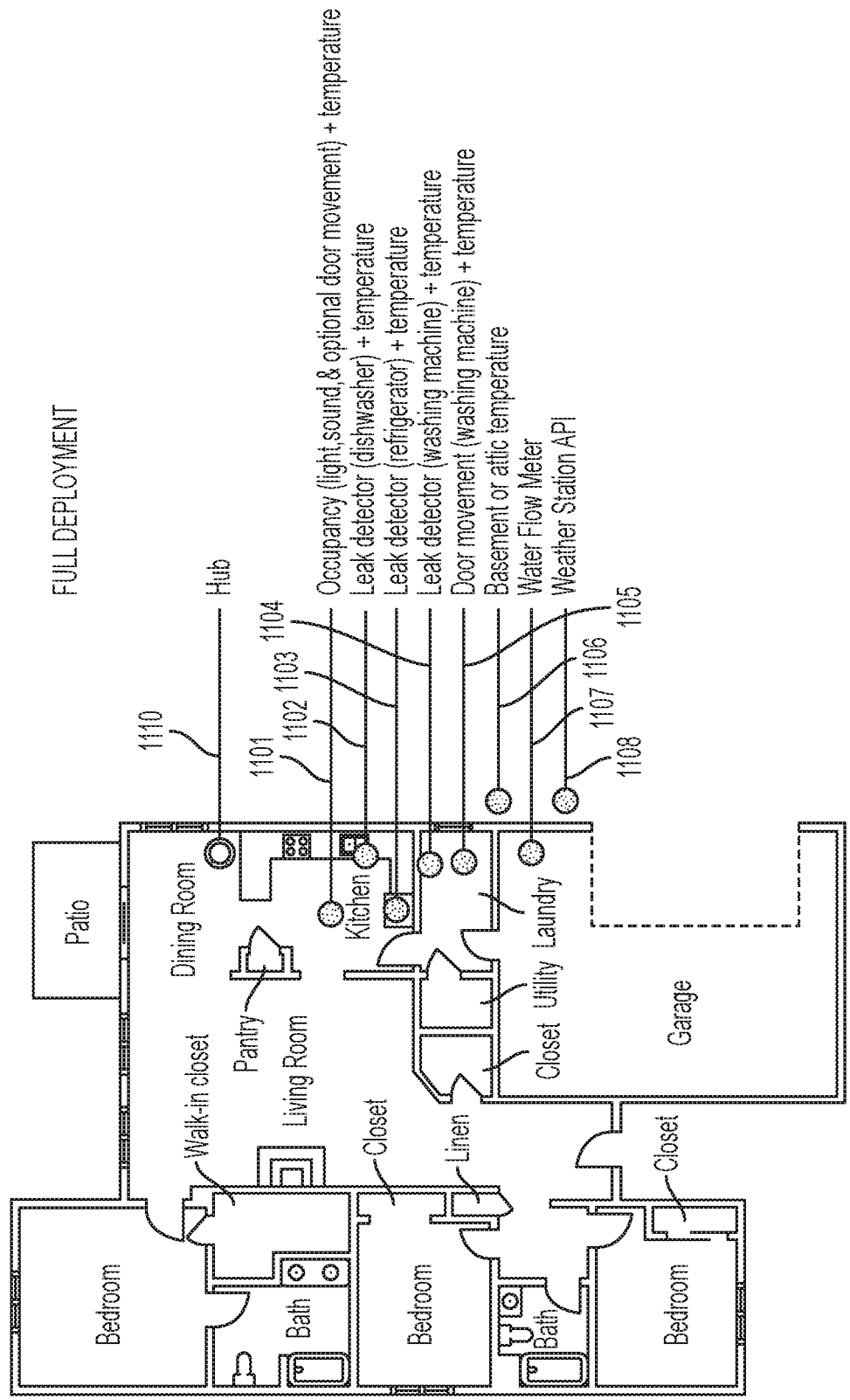
FIG. 11 is an example of deployed sensors in a home for sensing likely events.

Sensors can be used to determine water flow, leak detection, occupancy, electricity usage/surge detection, and temperature in multiple areas. Sensor specialists/installers may determine the type, quantity, and placement of sensors and install such sensors. Attention is drawn to FIG. 11 which depicts an example deployment of sensors in a home to detect different types of water claims. For example, one sensor 1101 may be placed in a kitchen to sense occupants (e.g. via light, sound, door movements) and temperature. One sensor 1102 may be placed near the dishwasher to detect leaks and temperature. One sensor 1103 may be placed near the refrigerator to detect leaks and temperature. One sensor 1104 may be placed near the washing machine to detect leaks and temperature. One sensor 1105 may be placed near the washing machine to detect door movement and temperature. One sensor 1106 may be placed in the basement or attic to detect temperature. One sensor 1107 may be placed at the water flow meter to detect excessive water flow, for example. A weather station 1108 may also be placed outside the home. The sensors and weather station may be connected to a hub which collects the data from various sensors a weather station.

The raw data may be forwarded and analyzed to recognize immediate events as well as provide batch data to prepare predicative assessments and risk models. For example, water flow sensors may be used to detect overall patterns and detect abnormalities. Expected time and rates of flows would be known for appliance usage or watering the yard. Excessive or extended water flow at unexpected water usage times may indicate a pipe burst (non-weather related). All of the data obtained, historical, third party reports (such as inspector reports), aggregated data from multiple homes, as well as data from specific homes (sensor data, homeowner provided data) may be used to score individual homes and provide risk assessments which may be used to predict the occurrence of water perils.

Real time conditions inside the home may be monitored in combination to assess changing risk states for specific perils. For a water peril related example, sensors may detect that no one is in the home, the temperature inside the home near exposed plumbing is at a critically low point, the water is flowing at an abnormal pattern, and a leak is detected, leading to the conclusion that a pipe burst freezing claim is occurring. If such an event is detected, an intervention may be triggered to mitigate the claim damage, such as notifying the homeowner or intervening directly to automatically shut off the home's water service.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A home services system to monitor a plurality of single-family homes for at least one type of water peril and at least one fire peril, the water peril comprising a pipe burst from freezing and the fire peril relating to electrical wiring or electrical panel wherein each single-family home is equipped with sensors and a connection to the Internet, comprising:

an in-home computing device located in each single-family home and communicatively coupled to the connection to the Internet; and a home services account server remotely located from the plurality of single-family homes and communicatively coupled to each in-home computing device over the Internet, the server including:

a processor; and a memory storing computer-executable instructions, which when executed by the processor, cause the server to:

receive in real-time, from the in-home computing device in each home of the plurality of single-family homes, sensor data retrieved from at least one sensor selected from light sensor, sound sensor, movement sensor, indoor temperature sensor, outdoor temperature sensor, leak sensor, and water flow sensor;

receive report data for each home of the plurality of single-family homes selected from at least one of a home inspection report, home checkup report, home owner survey report, and third party data;

receive environmental data for each home of the plurality of single-family homes, the environmental data being at least weather data and geographic data, the weather data including a number of days per year of below-freezing temperatures;

wherein the server analyzes report data including at least one selected from exposed pipes in unheated areas, missing insulation, gaps in insulation, and insulation type/rating;

analyze the sensor data, report data, and environmental data for each home of the plurality of single-family homes;

generate a risk score for one or multiple claims from analysis of the data for each home; and continue to monitor high or medium risk homes of the plurality of single-family homes, and intervene when a pipe burst from freezing is suspected of occurring by shutting off a water source and intervene when a fire peril claim event is suspected of occurring.

2. The system of claim 1, wherein the server analyzes report data including from home age.

3. The system of claim 1, wherein the server further monitors for a water leak, wherein the at least one sensor is selected from an outdoor temperature sensor, leak sensor, and water flow sensor.

4. The system of claim 1, wherein the server further monitors for an appliance leak, wherein the at least one sensor is selected from a leak sensor and water flow sensor, and analyzes report data including age of the appliance, expected life of the appliance, and usage of the appliance.

5. The system of claim 1, wherein the server further monitors for water heater overflow, the at least one sensor is selected from a temperature sensor, a leak sensor, and a water flow sensor, the report data includes at least one of age of the water heater, expected life of the water heater, water hardness, and levels of hot water consumption.

6. The system of claim 1, wherein the memory storing computer-executable instructions, which when executed by the processor, cause the server to further receives aggregate insurance claim and policy data concerning the at least one type of water peril and associate the aggregate claim and policy data with abnormal operating conditions for the at least one water peril for each home.

7. The system of claim 1, wherein the memory storing computer-executable instructions, which when executed by the processor, cause the server to identify abnormal operating conditions and modify the risk score based on data obtained from identified abnormal operating conditions.

8. The system of claim 1, wherein the memory storing computer-executable instructions, which when executed by the processor, cause the server to contact a home owner of a single-family home having a suspected claim event.

9. A method to monitor a plurality of single-family homes for at least one type of water peril, the water peril comprising a pipe burst from freezing, and at least one fire peril relating to electrical wiring or electrical panel comprising:

receiving in real-time, from in-home computing devices in a plurality of single-family homes, sensor data retrieved from at least one sensor selected from light sensor, sound sensor, movement sensor, indoor temperature sensor, outdoor temperature sensor, leak sensor, and water flow sensor;

receiving report data for each of the plurality of single-family homes selected from at least one of a home inspection report and home owner survey report;

receiving environmental data for each home of the plurality of single-family homes, the environmental data being at least one weather data and geographic data, the weather data including a number of days per year of below-freezing temperatures;

analyzing the report data including at least one selected from home age, exposed pipes in unheated areas, missing insulation, gaps in insulation and insulation type/rating;

analyzing the sensor data, report data, and environmental data for each home of the plurality of homes;

generating risk scores from analysis of the data for each home;

continuing to monitor at least one home of the plurality of homes;

identifying if an at least one water or fire peril is occurring; and intervening when a pipe burst from freezing is suspected of occurring by shutting off a water source and intervene when a fire peril claim event is suspected of occurring.

10. The method of claim 9, comprising analyzing the report data including home age.

11. The method of claim 9, further comprising monitoring for a water leak, wherein the at least one sensor is selected from an outdoor temperature sensor, leak sensor, and water flow sensor.

12. The method of claim 9, further comprising monitoring for an appliance leak, wherein the at least one sensor is selected from a leak sensor and water flow sensor, and analyzing the report data including age of the appliance, expected life of the appliance, and usage of the appliance.

13. The method of claim 9, further comprising monitoring for a water heater overflow, wherein the at least one sensor is selected from a temperature sensor, a leak sensor, and a water flow sensor, and analyzing the report data including at least one of age of the water heater, expected life of the water heater, water hardness, and levels of hot water consumption.

14. The method of claim 9, further comprising receiving aggregate insurance claim and policy data concerning the at least one type of water peril and associating the aggregate claim and policy data with abnormal operating conditions for the at least one water peril for each home.

15. The method of claim 9, further comprising identifying abnormal operating conditions and modifying the risk score based on data obtained from identified abnormal operating conditions.

* * * * *